April 4, 1961
A. J. QUINN
2,977,776
UNIVERSAL JOINTS
Filed April 15, 1958
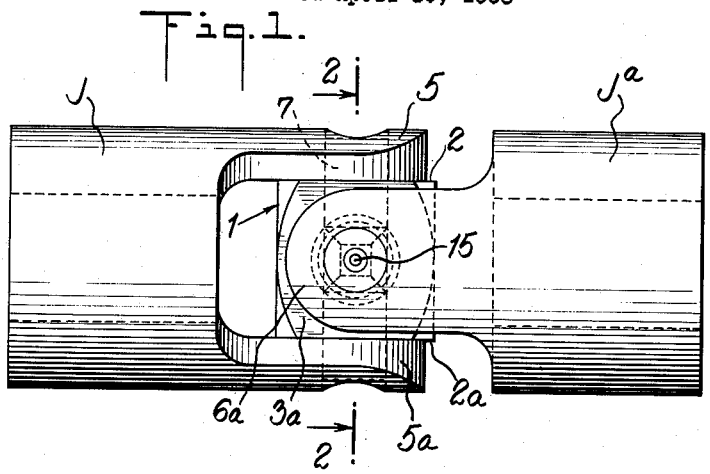
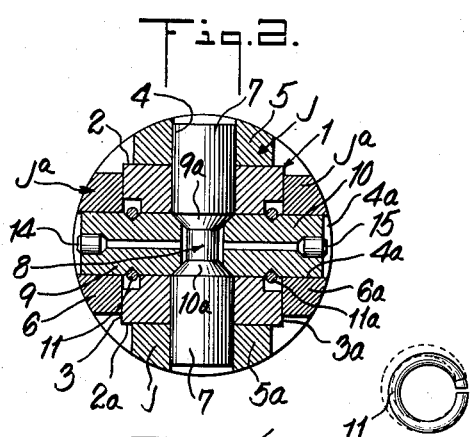 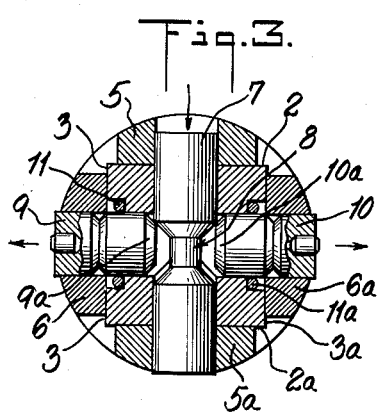
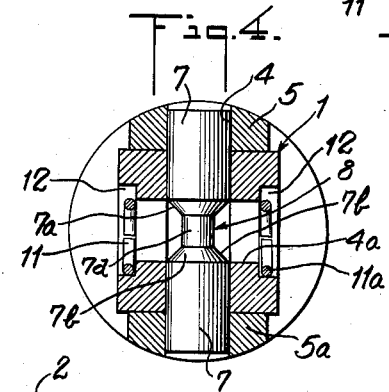 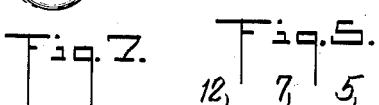 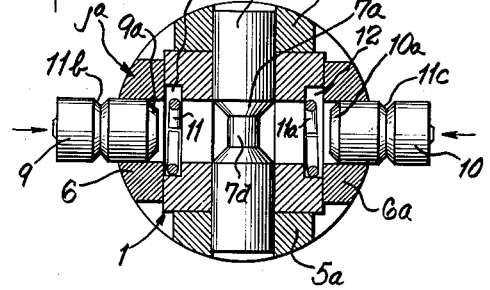
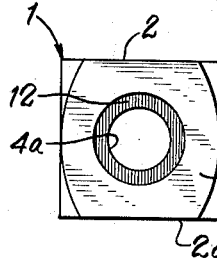 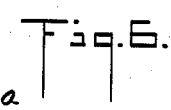
INVENTOR
ALOYSIUS J. QUINN
BY *Joseph F. O'Brien*
ATTORNEY

United States Patent Office 2,977,776
Patented Apr. 4, 1961

2,977,776
UNIVERSAL JOINTS

Aloysius J. Quinn, Ridgewood, N.J., assignor to Brooks Equipment Corporation, Hoboken, N.J., a corporation of New York Filed Apr. 15, 1958, Ser. No. 728,655

3 Claims. (Cl. 64—17)

This invention relates to improvements in universal joints, and particularly to joints heretofore patented by me.

In universal joints heretofore patented by me (U.S. Patent No. 2,648,207) the universal joint comprises a center-block member having opposed parallel surfaces provided with bores intersecting each other and being substantially perpendicular to said parallel surfaces, forked members having two pairs of lugs, each pair being disposed at opposed parallel surfaces of said block, a through pivot-pin member of given diameter having rotational bearing connections with one pair of said lugs, passing through one of said intersecting bores and having at its middle portion an end-engaging depressed seat with outwardly tapering walls between the depressed seat-portion and the outer peripheral surface of said through pivot pin, a complemental pair of stub pivot-pin members provided with rotational bearing connections with the other pair of lugs, having diameters substantially similar to the diameter of said through pivot-pin and passing through the other intersecting bore, said stub pivot-pin members having end portions projecting into said seat and provided with complemental tapering portions to provide interengaging rotational connections with the walls of said through pivot-pin, each of said stub pivot-pins also having a continuous circumferential groove, said block having a pair of coupling-pin bores, each extending in a direction of a chord to and registering with one of said circumferential grooves, and a conjoint coupling clip of resilient material embodying a pair of cylindrical coupling pins, each extending through one of said pair of coupling-pin bores in the block and passing segmentally through one of said circumferential grooves to connect said stub pin with said block while permitting free rotation thereof about its axis.

In this structure the pair of stub-pivot pins are coupled to the block by a conjoint coupling element comprising a U-shaped coupling clip of resilient material having a middle body part extending along and across the outside surface of the joint to permit manual engagement and disengagement of the said clip, combined with terminal leg portions which extend through bores in the block and into portions of annular grooves in the stub pivoting pins. The body part of the clip extends diagonally across the axis of the block to cause said terminal legs to engage said block bores and said groove portions on opposite sides of said stub pins. The terminal leg portions of said coupling element thus comprise a pair of legs which pass through corner bores in the center-block and then engage peripheral grooves in each of the stub pivot-members.

Said terminal legs extend outwardly from their connections with the body part of the clip and are resiliently contractible toward each other to permit insertion in said center-block bores, and said outward extension of the resilient terminal legs causes self-retaining frictional engagement with the walls of said bores.

It has been found in practice that a U-shaped resilient coupling clip of the type hereinabove specified that has a body portion which extends across the axis of the center block and conjointly engages block bores and grooves in two stub pivot members will, because of the outward extension, resilience and bending together of the legs and frictional engagement of such resilient legs with the center block and stub pins, have a tendency to work loose, and one of the objects of my present invention is to improve the means for coupling the stub pivot pins to the center block and to provide in a universal joint construction similar to that hereinabove described coupling elements which not only produce a good coupling engagement between the stub pivot pins and the central block but will avoid any tendency whatsoever of the coupling member to work loose during use or operation and thus to become released from the grooves in the joint, which of course would cause a separation by gravity of the parts of the joint from each other.

Another object of my invention is in a device of the character specified to provide coupling means for the block and pivot pins that will not in or during use be subjected to any frictional engagement or resilient strains and therefore will have no tendency to be released in use.

Still another object of my invention is to provide an independent coupling element for each of the stub pivot pins with the block comprising a substantially closed split ring fitting in pivot pin grooves and simultaneously housed within a housing in the central block, thus coupling each of the stub pivot pins to the central block and completely avoiding all tendency during use or operation of the joint to work loose.

Another object of my invention is to utilize a coupling-enclosing housing in the central block for each coupling element or split ring that will cause each of the coupling elements to cooperate with and be held in coupling engagement by a separate block-housing.

Another object of this invention is to enable more ready assembly and disassembly of the parts of the universal joint, and upon such disassembly to cause automatic disconnection of the coupling element first from the central block and then from the stub pivot pins.

Still another object of this invention is in a construction of the character specified to provide a center block having at opposite sides continuous circular grooves or depressions that will during use of the joint form a concealed and protective housing or cell for a pair of independently-operative split-ring coupling elements which take the place of the former single or conjointly-operating coupling pin, these coupling members being independent of each other and duplicated at opposite sides of the central block to independently couple each of two stub pivot pins with the central block.

Another object of my invention is to provide coupling members which are when closed circular in configuration and thus operate like a part of the pivot pin per se.

Still another object of this invention is to utilize in the stub pivot pins circular mounting grooves for the coupling elements, each of which are provided with an inclined wall or walls and which because of the inclined wall surfaces of such grooves in the stub member will during assembly and disassembly of the parts of the joint enable the coupling split ring to be increased in diameter and to be moved out of the grooves in the pivot pins by pressure applied through other adjacent parts of the joint such as the spaced lugs.

Still another object of this invention is to provide in each of the stub pivot pins duplicate oil cups so as to permit an oiling of the joint irrespective of the position thereof in relation to a wall or the like adjacent to which a universal joint may be operating, and also to enable application of oil equally at opposite sides of the axis of the depressed seat with which the ends of the stub pins engage.

With these and other objects in view, the invention comprises the combination of members and arrangement of parts so combined as to coact and cooperate with each other in the performance of the functions and the accomplishment of the results herein contemplated, and comprises in one of its adaptations the species or preferred form illustrated in the accompanying drawings, in which:

Fig. 1 is a side elevational view of my improved universal joint;

Fig. 2 is a sectional view of said joint taken on the line 2—2 of Fig. 1;

Fig. 3 is a section similar to Fig. 2 showing method of disassembly of the joint;

Figs. 4 and 5 are sectional views similar to Fig. 2 showing steps taken in order to assemble said joint;

Fig. 6 is a side elevational view of the central block showing one of the housings or cells for the split-ring coupling element; and Fig. 7 is an elevational view showing in full lines the closed split-ring stub pivot pins as shown in Fig. 2 and in dotted lines showing said split-ring when increased in diameter as illustrated in Fig. 3.

Referring now to these drawings which illustrate a preferred embodiment of my invention, 1 indicates a center block member having, as shown, two pairs of opposed parallel flat faces 2—2ª and 3—3ª. The block member 1 is provided with intersecting bores 4—4ª of substantially similar diameter, one bore passing through the block and being disposed perpendicularly to the faces 2—2ª while the other bore passes through and is disposed perpendicularly of the faces 3—3ª. J and Jª indicate joint members, each having forked end-portions provided with pairs of lugs 5—5ª and 6—6ª extending into contact with the pairs of opposed and parallel flat faces and having bores registering with the block bores 4—4ª.

In accordance with my present invention, I provide means by which the pivot pins, during operation and all operational stresses, will be firmly retained against axial displacement but will be readily and easily displaceable and removable during assembly and disassembly by a simple manipulation comprising a hammering movement through a member of the through pivot pins per se. In the embodiment illustrated, I provide a through pivot pin 7 which is passed through one member 5 of the pair 5—5ª of spaced lugs of the joint members J, thence through the bore 4 in the center block 1 and thence through the opposite member 5ª of the pair of spaced lugs. This through pivot 7 is coupled to and locked in place in the center block by the provision in the surface thereof of an end-engaging seat 8 and the reception therein of the end portions 9ª—10ª of a pair of stub pivot pins 9—10 disposed in opposite portions of the block bore 4ª.

These stub pivot pins 9 and 10 are each independently retained against axial movement by coupling elements 11, 11ª which are initially mounted in housings or cells 12 in the center-block and then moved into a releasable though firm seating and interengagement with the stub pivot pins 9 and 10.

As illustrated, the stub pivot pins 9 and 10 each embody grooves 11ᵇ, 11ᶜ into which the coupling elements 11, 11ª (each of which comprise a circular split ring) are by an assembling movement seated and by a disassembling movement unseated.

Such assembling and disassembling movements are accomplished by providing a wide circumferential groove 7ª in the middle of the cylindrical through pivot pin 7. This groove 7ª has inclined or tapering walls 7ᵇ—7ᶜ extending from the outer cylindrical surface of the pin 7 to an axial cylindrical portion 7ᵈ of smaller diameter than the outer surface of said through pivot pin; the stub pivot pins 9 and 10 also comprise cylindrical members, each having a diameter at the contacting part that is similar to the diameter of the through pin at such contacting part and the end contact portions 9ª, 10ª of said stub pins 9 are frustroconic in conformation so as to project into the seat or groove 7ª in the pivot pin 7 and to provide a complemental tapering portion which contacts with the inclined or tapering walls 7ᵇ, 7ᶜ of the said seat or groove 7ª in the pivot pin 7 and thus to produce a freely-movable frictional coupling contact and engagement between the stub pivot pins 9 and 10 and said through pivot pin 7, while at the same time permitting free rotation of the through pin and stub pivot pin in their respective bores.

My preferred form of coupling or axial-locking for the pivot pins 7, 9 and 10, and particularly for the stub pivot pins 9 and 10, preferably comprises the provision of peripheral grooves 11ᵇ—11ᶜ in the stub members 9 and 10, as aforesaid, and the employment in the center-block at the opposite sides thereof, having the stub pin bores of grooves or depressions 11ᵇ and 11ᶜ that will, during the use of the joint, form concealed and protective housings or cells for a pair of coupling members comprising split-rings 11 and 11ª, and in the preferred embodiment of my invention shown these split-ring coupling members 11 and 11ª are independent of each other and are each firmly held at opposite sides of the central-block 1.

These coupling elements 11, 11ª as shown engage the stub pivot pins 9 and 10 with the block 1 and when disassembled each of them comprises a substantially closed split-ring as shown in Fig. 7. Said split-ring in assembly of the elements of the joint are mounted in the housings or cells 12 surrounding the stub pins 9 and 10, and in an assembling movement are moved along the stub pin so as to fit in pivot-pin grooves 11ᵇ, 11ᶜ. It is thus simultaneously housed within housings 12 in the central block and couples each of the stub pivot pins to the central block. This simple arrangement of parts completely avoids all tendency during use or operation of the joint to work loose, and the coupling or enclosing housing in the central block for each split-ring coupling element comprises a separate block housing or cell that normally will cause each of the coupling elements to be retained in place and will cooperate with said coupling element and cause the same to be held in coupling engagement.

In order to disassemble the joint pressure is applied as shown in Fig. 2 by a suitable instrument on the through pivot pin 7, which as above stated has an end-engaging seat and is coupled and locked in place in the center block by the provision in the surface thereof of the end-engaging seat and the reception therein of the end portions 9—9ª of the pair of stub pins 9. Such suitable pressure by an instrument upon the pivot pin 7 will cause an outward movement of the stub pins 9 and 10, respectively, through the pair of the spaced lugs of one of the joint members. During such disassembly, the split-rings will be moved from their grooves as indicated in Fig. 3 outwardly to engage the greater cylindrical surface of the stub-pins and thereafter these stub-pins may be removed entirely and the split-ring will then return to its normal closed position as shown in full lines in Fig. 7, the open position of the said ring being illustrated in dotted lines in said figure.

In re-assembly of the joint the bores of the pivot member 7 are first aligned and said member 7 is first passed through between a pair of the spaced lugs of the joint member and moved into place through said bores in said lug members and in said central block. The split rings are then put in place in their housings or cells at opposite sides of the central block, the spaced legs of the through joint member are properly positioned and the stub-pins 9 and 10 are passed through the bores in the said spaced lugs and in through the bores in the block.

During such inward movement of the stub-pins, the ends thereof will engage and increase the diameter of the split-rings so that they will first ride upon the ends of the stub-pins and will thereafter when the stub-pins are driven home drop into their grooves in such stub-pins. Each groove will be positioned beneath the housings or cells 12 in the facing of the central block, whereupon the construction will assume the position shown in Fig. 4 and thereupon will be fully assembled and ready for operation.

In the preferred embodiment of my invention I employ duplicate oil cups 14 and 15, one in each of the stub-pins 9 and 10 respectively. Such duplicate oil cups permit an oiling of the joint irrespective of the position thereof in relation to a wall or the like adjacent to which a universal joint may be operating.

It will be seen that all the pivot elements in my improved universal joint comprising the through pivot pin and the duplicate stub pivot pins rotate freely in their respective bores and in relation to each other, and the coupling members also rotate freely with the stub pivot pins. Thus, the duplicate stub pivot pins, each of which carries a coupling member comprising a completely-circular split ring, rotate freely in relation to and within the center block. Also in the contact of the stub pins with the through pivot pins there is free rotation. Furthermore, all the pivot members rotate freely at their end connections with the lugs or forked end portions of the joint members.

It will be noted that during operational movement there is no wear, stress or retardation caused by the duplicate split-ring coupling members. Each of these coupling members is mounted on a stub pivot pin independently of the other and because of the fact that these split-ring coupling members are circular in conformation and, as aforesaid, rotate freely with the stub pivot pins in relation to the center block, there is a minimum of wear on all elements of the universal joint and said joint will consequently wear and endure for a long period of time.

Having described my invention, I claim:

1. A universal joint which comprises a center block having two pairs of flat surfaces, the surfaces of one pair being at right angles to those of the other to provide a block of square cross section, said block having, on a common plane, a pair of bores of equal diameter, one bore for each pair of flat surfaces, extending normal to its flat surfaces and equidistant from the surfaces of the other pair of surfaces and intersecting each other at the center of the cross section of said plane, a pair of forked joint members extending from opposite directions with the forked end of one member extending over the flat surfaces of one pair of flat surfaces and the forked end of the other member extending over the flat surfaces of the other pair, each of said forked ends having coaxial holes coaxial with the bore of its respective pair of surfaces and of equal diameter therewith, a through pin in one of said bores extending from within the holes of its member through said bore to within the opposite hole, said pin having a circumferential groove of a width equal to the diameter of said pin and having sloping sides, a pair of stub pins extending one from within each hole of the other forked joint member through the aligned bore into the circumferential groove of the through pin and having their inner ends champfered to correspond to the sloping sides of the groove, the sloping sides of said groove and of said stub pins being such that longitudinal movement of said through pin will displace said stub pins longitudinally outwardly, each said stub pin having a circumferential groove, said joint having a circumferential groove circling the groove of each said stub pin, and a clip ring partly in the grooves of said pin and of said joint and expansible into the groove of said joint to permit withdrawal of said stub pins.

2. A universal joint construction as claimed in claim 1 in which the ends of the stub pins are spaced from the axial bottom of said groove at the middle of the through pin to provide an oil-receiving space at the each said stub pin, and a clip ring partly in the grooves with an oil channel extending axially through each pin and communicating with said oil space at the center of the universal joint.

3. A universal joint as claimed in claim 1 in which the bottom of the groove in the through pin is in assembled condition spaced from ends of the said stub pin and said stub pins embody an axially-disposed oil channel extending from the outer end thereof to said depressed seat and said stub-pins also are provided with a centrally-disposed oil cup to enable equal amount of oiling at opposite sides of the axis of the joint between the through and stub pins and also to enable more ready access by an oiler of the oil cups irrespective of the position of the joint in regard to walls and like obstructions.

References Cited in the file of this patent
UNITED STATES PATENTS

| | | |
|---|---|---|
| 1,286,267 | Fletcher | Dec. 3, 1918 |
| 1,323,023 | Curtis | Nov. 25, 1919 |
| 1,346,776 | Washburn | July 13, 1920 |
| 2,648,207 | Quinn | Aug. 11, 1953 |